F. T. BOHAN.
TIRE COVER.
APPLICATION FILED SEPT. 16, 1920.
1,428,580.
Patented Sept. 12, 1922.
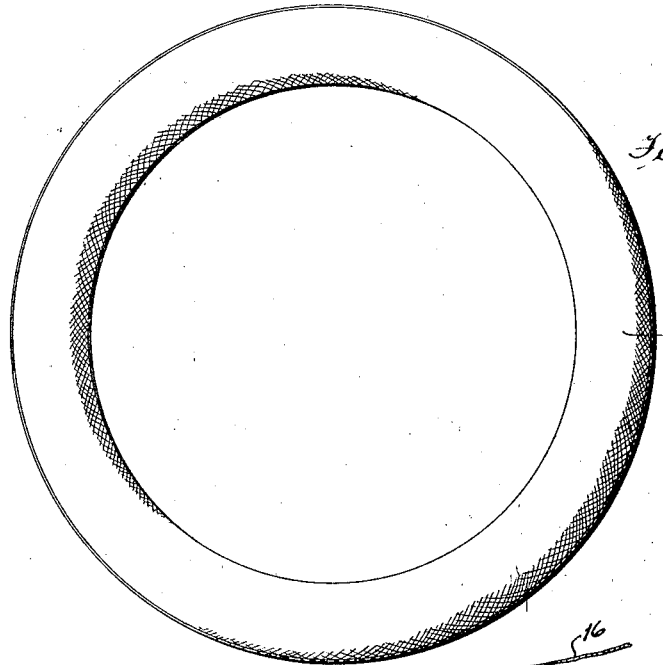
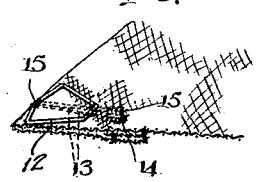
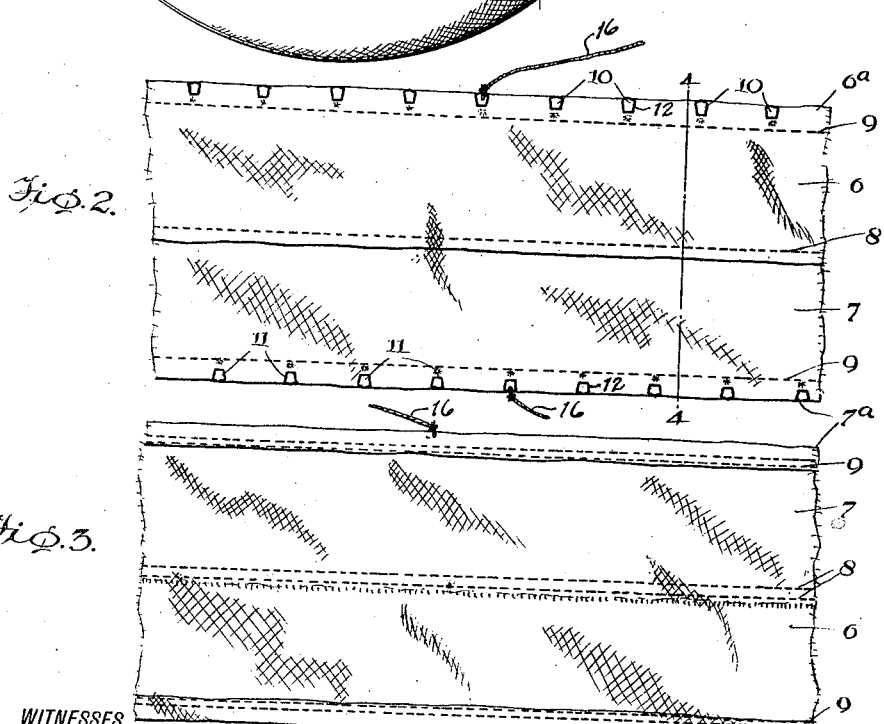
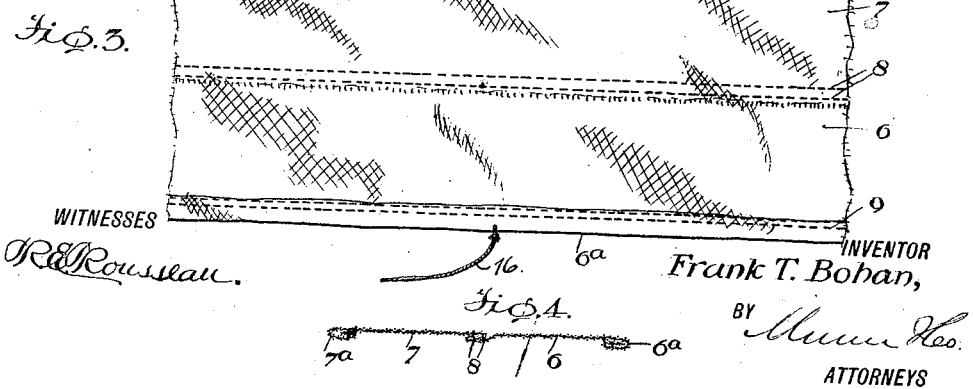
WITNESSES
R. E. Rousseau
INVENTOR
Frank T. Bohan,
BY
ATTORNEYS Patented Sept. 12, 1922.

1,428,580

UNITED STATES PATENT OFFICE.

FRANK T. BOHAN, OF NEW BRUNSWICK, NEW JERSEY.

TIRE COVER.

Application filed September 16, 1920. Serial No. 410,580.

*To all whom it may concern:*

Be it known that I, FRANK THOMAS BOHAN, a citizen of the United States, and a resident of New Brunswick, in the county of Middlesex and State of New Jersey, have invented certain new and useful Improvements in Tire Covers, of which the following is a specification.

My invention relates to tire covers, and has for its object to provide a tire cover which is of simple and durable construction and easy and inexpensive to manufacture, which is effective to encase and protect the tire and readily manipulated to receive and release the same and which is capable of continuous use.

Other objects and advantages of the invention reside in certain novel features of construction, combination and arrangement of parts as will be hereinafter more fully described and particularly pointed out in the appended claims, reference being had to the accompanying drawings forming part of this application, and in which:

Figure 1 is a side elevational view of the tire cover containing a tire;

Figure 2 is a fragmentary plan view of a portion of one side of the tire cover, spread out to illustrate the construction;

Figure 3 is a similar view of the opposite side;

Figure 4 is a transverse sectional view on line 4—4 of Figure 2; and

Figure 5 is a fragmentary detail perspective view illustrating the construction of the marginal edges, the features of the lacing device and the manner in which they are associated with the marginal edges.

Referring to the drawings it will be seen that the invention comprises an endless envelope 5 consisting of two endless annular fabric bands 6 and 7, preferably constructed of burlap, overlapping each other along one of their marginal edges and secured through the overlapping portions by circumferential lines of stitching 8. The other marginal edges, designated at $6^a$ and $7^a$ are adapted to normally lie closely together and adapted to define an opening adapted to permit the tire to be entered into and to be withdrawn from the cover. The marginal edges $6^a$ and $7^a$ of the annular bands 6 and 7 are turned back upon the bands, as shown in Figure 5, and are each secured to the body of the band by a circumferential line of stitching, designated at 9.

A lacing device is provided for securing the open marginal edges $6^a$ and $7^a$ together in order to retain the tire in the cover when desired. The lacing device includes a row of fastening devices 10 disposed along the marginal edge $6^a$ and a similar row of fastening devices 11 disposed along the other marginal edge 7. The fastening devices of the row 10 are alternately arranged with respect to the fastening devices of the row 11, as clearly shown in Figure 2. As shown in Figure 5 each of the fastening devices are constructed of a single piece of wire which is bent to form a loop 12, the ends of the wire being extended centrally of the loop, as at 13. The extremities of the ends 13 are bent to form eyes 14. The loops 12 are arranged on the outside of the marginal edges of the annular band 6 and the ends 13 are entered through the fabric and are disposed between the inturned edges and the body of the fabric and are secured by suitable stitching 15 which extends through the fabric and around the ends 13 and through the fabric and the eyes 14. Lacings 16 are secured at one end to oppositely disposed fastening members of the rows 10 and 11, as shown in Figure 2, and after the tire has been received in the envelope the lacings are reeved in opposite directions through the loops of the fastening devices entirely throughout the circumferential extent of the envelope and the adjacent end of the lacings are then secured together in any suitable manner and the tire is retained in position within the cover.

In practice, when it is desired to place a tire within the cover the endless envelope constituting the same is opened and a portion thereof is spread upon the floor or other suitable support. The tire is then placed upon the spread out portion and is then rolled until it is entirely entered within the cover. The lacings 16 are then reeved through the fastening devices of the rows 10 and 11 and the ends of the lacing are tied together or otherwise secured so that the tire is positively retained within the cover. The lacings may be readily unreeved and the tire easily withdrawn. The cover is adapted for continuous use and need not be destroyed or thrown away when its utility as respects a single tire is completed. When the tire is within the cover it is adequately protected and no material weight is added thereto.

I claim:

1. A tire cover comprising an endless envelope consisting of two endless annular bands of burlap overlapping each other along one of their marginal edges and secured together by a circumferential line of stitching, the other edges of said annular bands being adapted to lie closely adjacent and to define an opening to receive the tire, said last-mentioned marginal edges being turned back upon the body of the annular bands and secured to the body by a line of stitching, and a lacing device for securing the open edges of the bands to retain a tire in the envelope consisting of a row of fastening devices along one of said edges and a row of fastening devices along the other of said edges and alternately arranged with respect to the first mentioned fastening devices, each of said fastening devices being constructed of a single piece of wire bent to form a loop disposed exteriorly of the marginal edges and having ends provided at their extremities with eyes, said ends and said eyes being arranged between the body of the annular band and the turned back portion and secured thereto by stitching extending around said ends and through said eyes, and lacings adapted to be reeved in opposite directions through said fastening devices and to have their free ends secured together.

2. A tire cover comprising an endless envelope consisting of two endless annular bands of burlap overlapping each other along one of their marginal edges and secured together by a circumferential line of stitching, the other edges of said annular band being adapted to lie closely adjacent and to define an opening to receive the tire, said last mentioned marginal edges being turned back upon the body of the annular band, a line of stitching for securing each of the turned back edges to the body of its band, and a lacing device for securing the open edges of the band to retain a tire within the envelope and comprising a row of fastening devices along one of said edges, and a row of fastening devices along the other of said edges and alternately arranged with respect to the first mentioned fastening devices, each of said fastening devices having portions arranged between the body of the annular band and the turned back portion and secured thereto, and lacings adapted to be reeved in opposite directions through said fastening devices and to have their free ends secured together.

FRANK THOMAS BOHAN.